United States Patent [19]

Akasu et al.

[11] Patent Number: 4,911,846
[45] Date of Patent: Mar. 27, 1990

[54] FLUID TREATING APPARATUS AND METHOD OF USING IT

[75] Inventors: Hiroyuki Akasu; Rishichi Mimura, both of Kurashiki; Takao Migaki, Okayama; Takashi Yamauchi, Soja; Michio Kusachi, Kurashiki, all of Japan

[73] Assignee: Kuraray Co., Ltd., Kurashiki, Japan

[21] Appl. No.: 354,794

[22] Filed: May 22, 1989

[30] Foreign Application Priority Data

May 27, 1988 [JP] Japan .................. 63-130748

[51] Int. Cl.⁴ .................................. B01D 13/00
[52] U.S. Cl. ............................. 210/645; 210/321.8; 210/321.89; 210/500.23
[58] Field of Search ........ 210/634, 641, 644, 645–647, 210/649–655, 321.6, 321.64, 321.72, 321.78, 321.79, 321.8, 321.82, 321.87, 321.88, 321.89, 321.9, 500.23

[56] References Cited

U.S. PATENT DOCUMENTS

| | | |
|---|---|---|
| 3,957,648 | 5/1976 | Roget et al. ............ 210/321.88 |
| 3,993,816 | 11/1976 | Baudet et al. ............ 210/500.23 |
| 4,140,637 | 2/1979 | Walter ................ 210/321 |
| 4,231,877 | 11/1980 | Yamauchi et al. . |
| 4,350,594 | 9/1982 | Kawai et al. . |
| 4,384,954 | 5/1983 | Nakashima et al. . |
| 4,397,747 | 8/1983 | Ikeda . |
| 4,402,940 | 9/1983 | Nose et al. . |
| 4,416,772 | 11/1983 | Sato et al. . |
| 4,420,395 | 12/1983 | Tanihara et al. . |
| 4,421,684 | 12/1983 | Nakashima et al. . |
| 4,472,303 | 9/1984 | Tanihara et al. . |
| 4,492,531 | 1/1985 | Kenji et al. . |
| 4,547,289 | 10/1985 | Okano et al. . |
| 4,559,034 | 12/1985 | Kirita et al. . |
| 4,650,457 | 3/1987 | Morioka et al. . |
| 4,721,564 | 1/1988 | Harada et al. . |
| 4,747,952 | 5/1988 | Nakano et al. . |

FOREIGN PATENT DOCUMENTS

| | | |
|---|---|---|
| 0089122 | 2/1983 | European Pat. Off. . |
| 2721444 | 11/1978 | Fed. Rep. of Germany . |
| 3144813 | 2/1987 | Fed. Rep. of Germany . |
| 6028806 | 2/1985 | Japan . |

*Primary Examiner*—Frank Sever
*Attorney, Agent, or Firm*—Kramer, Brufsky & Cifelli

[57] ABSTRACT

Disclosed is a fluid treating apparatus of hollow fiber type. The apparatus can prevent channeling or stagnation of the fluid which flows inside it by specifying the densities of the hollow fibers and the warps forming a hollow fiber sheet and the laminating conditions for laminating the hollow fiber sheets to form a laminate which is to be housed in a housing.

14 Claims, 8 Drawing Sheets

FLUID TREATING APPARATUS AND METHOD OF USING IT

BACKGROUND OF THE INVENTION

1. Field of the invention

This invention relates to a fluid treating apparatus utilizing a hollow fiber and the method of using it, particularly to an apparatus and method suited for treating blood. The apparatus is generally used for blood dialyzers, artificial lungs, plasma separators, humidifiers and the like. The explanation herein is for convenience given on the case where the apparatus is applied to an artificial lung.

2. Description of prior art

Artificial lungs have a gas exchanging function which can add oxygen to and remove carbon dioxide from the human blood, which function is one of the functions exhibited by the human lung. Bubble-type artificial lungs and membrane-type ones are currently in use.

The bubble-type artificial lung has been widely used in clinics. It however has been pointed out that with the system there tends to generate hemolysis, protein degeneration, blood clotting and minute thrombi, or activation of leukocytes or complements, and that the defoaming effect weakens upon a long-period use to thereby cause minute bubbles to invade into the blood.

The membrane-type artificial lung will contact the blood with a gas via a membrane between the two to absorb oxygen into the blood and at the same time discharge carbon dioxide into the gas. The apparatus has advantages of a smaller blood damage and a smaller priming volume compared to those with the bubble type and has hence gradually been used instead of the bubble type.

The membrane-type artificial lungs so far developed conduct gas exchange via hollow fiber membrane by using a microporous hollow fiber made of a hydrophobic polymer such as polyolefin or a homogeneous hollow fiber of a material having a gas permeability such as silicone. They consist of two types, i.e. the intracapillary flow type which comprises flowing the blood inside a hollow fiber while flowing a gas outside the hollow fiber (cf. Japanese Patent Application Laid-Open Nos. 106770/1987, 57661/1984, etc.), and the extracapillary flow type which comprises flowing a gas inside a hollow fiber and flowing the blood outside the hollow fiber (cf. Japanese Patent Application Laid-Open Nos. 57963/1984, 28806/1985, etc.).

In the intracapillary-flow type artificial lungs, when the blood is uniformly distributed inside a multiplicity of hollow fibers, the blood flow inside the hollow fiber is a complete laminar flow though there occurs no channeling (biassed flow) of the blood. The inner diameter of the hollow fiber therefore is required to be decreased for the purpose of increasing the gas exchanging ability (gas transfer rate per unit area of membrane), and hollow fibers having an inner diameter of 150 to 300 $\mu$m have been developed.

However, even with a small inner diameter, the gas exchanging ability cannot increase sharply insofar as the blood flows in a laminar flow. Then, the intracapillary-flow type artificial lung requires a membrane area as large as about 6 m$^2$ for achieving a gas exchanging ability of 200 to 300 cc/min which is necessary when open heart surgery is conducted on a grown up person, and is thus large and heavy and hence difficult to handle. Furthermore, they have a large priming volume to thereby increase the burden of patients. If the inner diameter is made still smaller by compactization of the artificial lung to improve handling, there will occur frequent clotting (clogging of the inside of hollow fibers due to blood clotting). Besides, the artificial lungs of this type cannot conduct flow by gravity due to the large resistance in the blood passage, and are hence difficult for use with a blood pump of pulsation flow type. In the artificial lungs, if the gas is supplied while being not so uniformly distributed, carbon dioxide removing ability (transfer rate of carbon dioxide per unit area of membrane) will decrease; and it is difficult to distribute and supply the gas sufficiently uniformly to several thousands to several tens of thousands of hollow fibers. Special designs therefore are necessary for supplying the gas uniformly to a multiplicity of hollow fibers.

On the other hand, in the extracapillary-flow type artificial lungs, it is expected that the gas be more uniformly distributed and the blood flow have some disturbance therein. However, it has been pointed out that there tend to occur shortage of oxygenation caused by channeling of blood flow or blood clotting due to stagnation of blood flow. Commercially available extracapillary-flow type artificial lungs have a problem that there is required a large membrane area for compensating the shortage of oxygenation due to channeling of blood flow, resulting in a large priming volume. Where an artificial lung is used for a patient having a small amount of blood, blood transfusion therefore is required, which in turn leads to the danger of the patient's catching hepatis, AIDS or the like.

The present inventors have paid attention to the extracapillary-flow type artificial lungs, which suffer little pressure loss and are expected to increase their gas exchanging ability per unit area, and tried to eliminate its drawbacks, i.e. channeling and/or stagnation of blood flow by the use of a sheet of cord-fabric type comprising a multiplicity of hollow fibers connected with warps. However, it then was found that simply placing a laminate of sheets of hollow fibers connected with warps into cord-fabric type in a housing would increase, contrary to expectation, channeling of blood and decrease the gas exchanging ability per unit membrane area.

SUMMARY OF THE INVENTION

Accordingly, an object of the present invention is to provide a compact fluid treating apparatus, particularly artificial lung which can prevent the treated blood from stagnation or channeling and causes a small pressure drop.

Another object of the invention is to provide a method for treating fluid by using the above apparatus.

The present inventors have pursued the causes of blood channeling and found that such problem had been caused by the fact that the openings of the hollow fiber sheets formed by individual hollow fibers and the warps deform due to blood flow. The inventors have further studied how to laminate the hollow fiber sheets to minimize such deformation and come to the invention. The present invention provides a fluid treating apparatus of hollow fiber type which comprises a laminate of hollow fiber sheets comprising a multiplicity of single hollow fibers or bundles of hollow fibers connected through warps, said laminate being housed in a housing having an inlet and outlet for a first fluid which inlet and outlet connect with the space formed by the hollow fibers and the housing and an inlet and outlet for a second fluid which inlet and outlet connect with inside of the hollow fibers, the both ends of the laminated hollow fiber sheets being embedded in a pair of resin partitions and held liquid tight on the housing, characterized in that the following formulae are satisfied:

$$0.2 \leq W \leq 4.0$$

$$0.5 \leq T \leq 12.0$$

$$10^8/(3.0 \times D)^2 \leq F \times I < 10^8/(0.93 \times D)^2$$

wherein:
D is the diameter in $\mu$ of a hollow fiber or a bundle of hollow fibers,
W is the density in pieces per cm of the warps connecting a multiplicity of single hollow fibers or bundles of hollow fibers,
F is the density in pieces per cm of single hollow fibers or bundles of a plurality of hollow fibers per unit length of the hollow fiber sheet,
I is the number of hollow fiber sheets laminated per unit thickness in sheets per cm, and
T is the thickness in cm of the laminate of the hollow fiber sheets.

BRIEF DESCRIPTION OF THE DRAWING

A more complete appreciation of the invention and many of the attendant advantages thereof will be readily obtained as the same become better understood by reference to the following detailed description when considered in connection with the accompanying drawings, wherein:

FIG. 3 (a), (b), (c) and (d) are cross-sectional views of the hollow fiber sheets;

DESCRIPTION OF THE PREFERRED EMBODIMENTS

Figure 1:
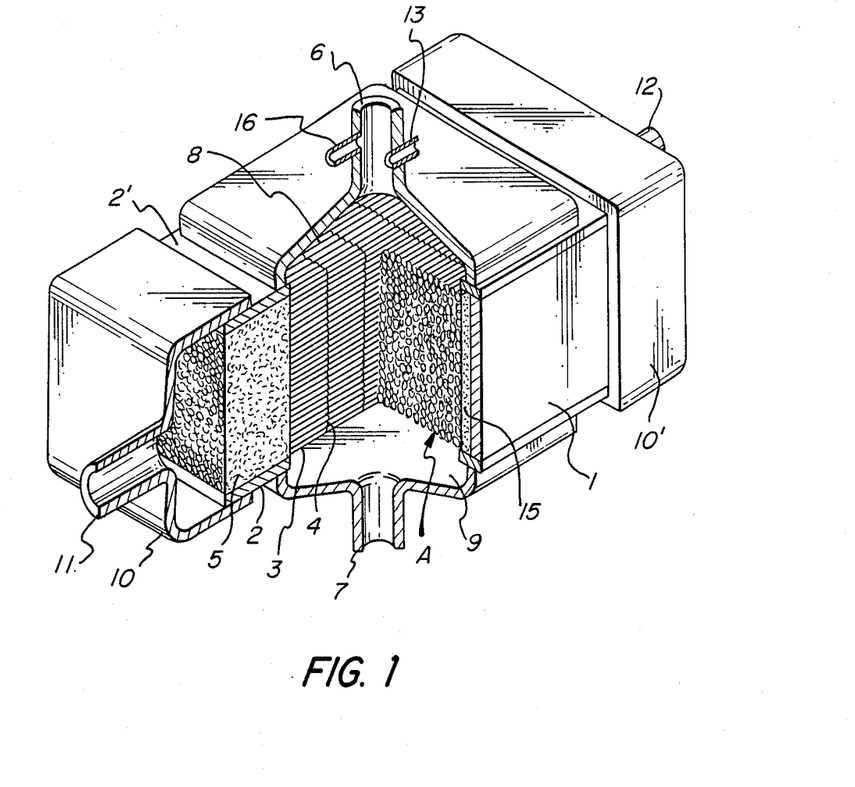
FIG. 1 is a parially cutaway perspective view of the fluid treating apparatus of hollow fiber type according to the present invention.

FIG. 1 is a perspective view showing an extracapillary-flow type artificial lung which is an example of the hollow fiber fluid treating apparatus of the present invention. As shown in FIG. 1, the artificial lung comprises a cylindrical housing 1 (in FIG. 1 the housing is of a square-pillar shape) and a laminate A of hollow fiber sheets each comprising a multiplicity of hollow fibers 3 formed into a cord-fabric shape through warps 4, which laminate is held with a pair of shape maintaining plates 2 and 2' each having a large opening at its center. The both ends of the laminate A of the hollow fiber sheets are supported and fixed liquid tight by resin partitions 5 in the housing 1. The hollow fibers 3 expose their open ends outwardly form the resin partitions 5. The resin partition 5 form a closed blood chamber inside the housing 1. An outlet 6 and an inlet 7 for blood are provided on the top and the bottom walls of the housing, respectively. A blood outlet chamber 8 connected to the blood outlet 6, and a blood inlet chamber 9 connected to the blood inlet 7 are formed between the top wall of the housing and the top surface of the laminate and between the bottom wall of the housing and the bottom surface of the laminate, respectively. The ends of resin partitions 5 are each covered with a head cover 10, 10'. On the head covers 10, 10' are mounted a gas inlet 11 and a gas outlet 12. The head cover 10' of the gas outlet 12 side is not necessarily mounted. When it is not mounted, the gas is directly discharged into atmosphere from the open ends of the hollow fibers embedded in the resin partition 5. 13 is a gas vent for removing bubbles contained in blood. 16 is an insert for a temperature sensor.

Figure 2:
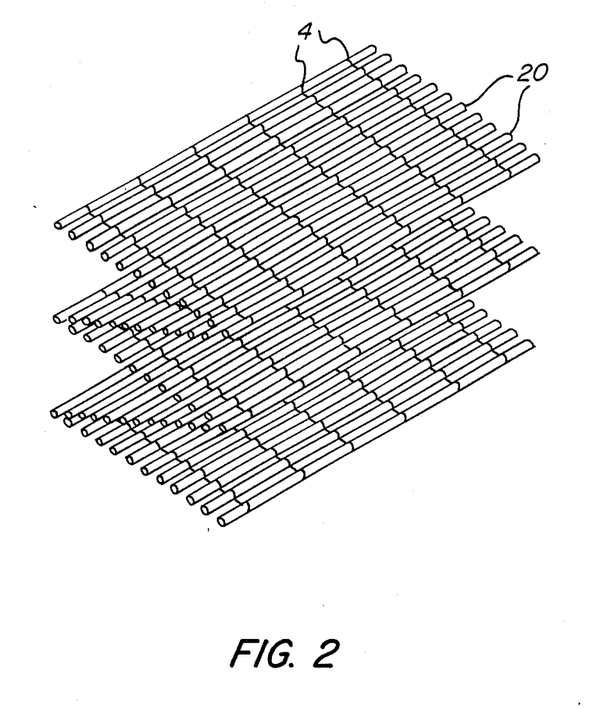
FIG. 2 is a perspective view showing an example of how the hollow fiber sheets are laminated.
Figure 3A:
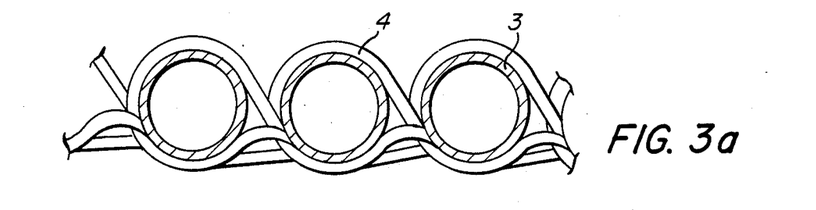
Figure 3B:
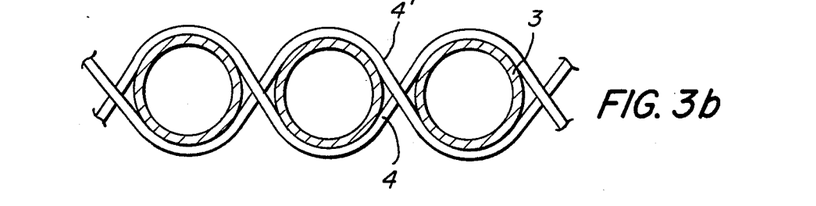
Figure 3C:
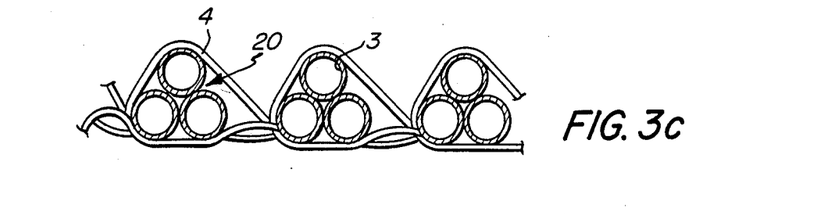
Figure 3D:
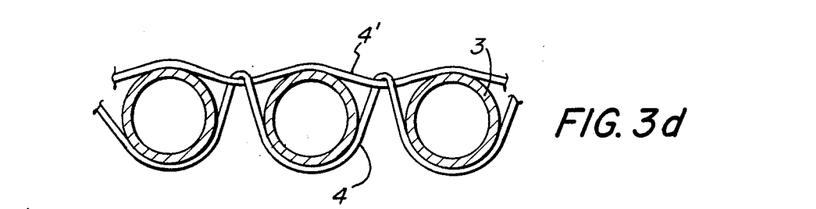
Figure 4:
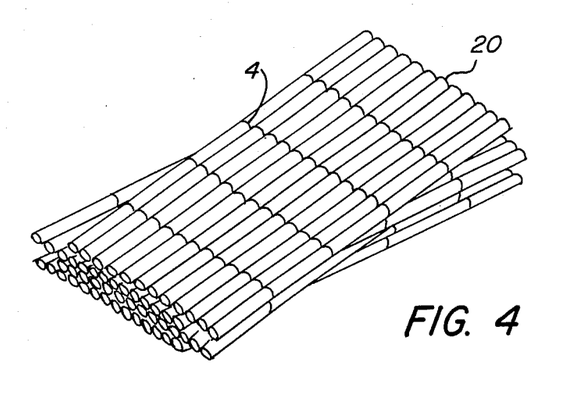
FIG. 4 is a plan showing another example of how the hollow fiber sheets are laminated.

In the above-described hollow fiber artificial lung, the laminate A of hollow fiber sheets of cord-fabric type, which is to be housed in a square-pillar shape housing 1, may for example be made, as shown in FIG. 2, by reciprocally folding up an endless hollow fiber sheet formed by connecting with warps 4 a multiplicity of parallely arranged single hollow fibers or bundles of a plurality of hollow fibers 20 (FIG. 2 shows the case of single hollow fibers) into cord-fabric shape, or by laminating a plurality of hollow fiber sheets previously cut to a prescribed shape one upon another. Where the hollow fiber sheets are laminated one upon another, it is preferred to laminate the hollow fiber sheets in such a manner that every sheet is placed obliquely relative to the next sheet as shown in FIG. 4, so that the upper and the lower hollow fibers or bundles of a plurality of hollow fibers 20 will cross each other at an angle, whereby channeling of blood is improved. For the purpose of forming a sheet from a multiplicity of parallel single hollow fibers or bundles of a plurality of hollow fibers, they, as wefts, may be woven with warps, or be adhesive-bonded to warps but, the former is preferred since it is easier.

Figure 5:
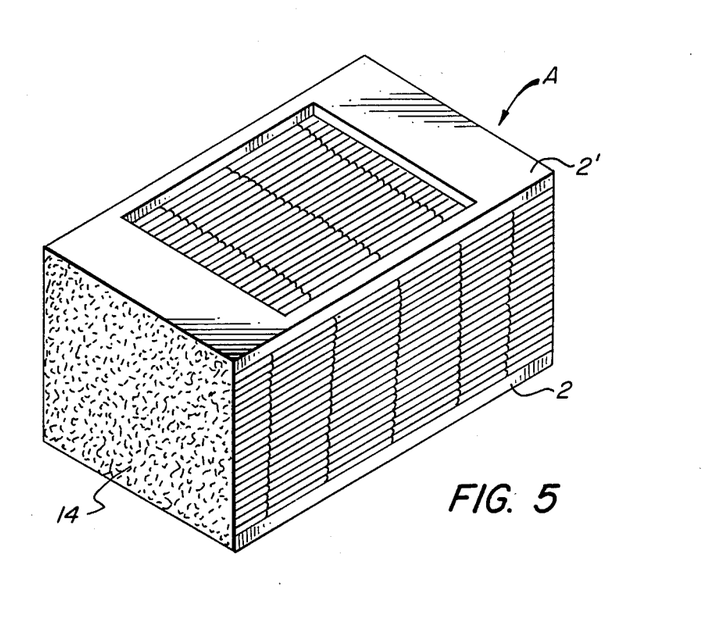
FIG. 5 is a perspective view of an example of the laminate of the hollow fiber sheets.

FIGS. 3 (a), (b), (c) and (d) show cross-sectional views of hollow fiber sheets woven into a cord-fabric shape; FIGS. 3 (a), (b) and (d) show ones utilizing a single hollow fiber 3 and FIG. 3 (c) shows another one utilizing a bundle 20 of three hollow fibers 3. Hollow fibers may be woven with warps into a cord fabric by any weaving method, e.g. a method comprising a warp each forming a loop around each single hollow fiber or bundle of a plurality of hollow fibers to thereby fix the single hollow fibers or bundles of a plurality of hollow fibers, e.g. chain stitch, as shown in FIGS. 3 (a) and 3 (c); a method which comprises a pair each of warps fixing each single hollow fiber or bundle of hollow fibers as shown in FIGS. 3 (b) and (d), e.g. "leno" weaving; or the like. The method of fixing each single hollow fiber or bundle of a plurality of hollow fibers by forming a loop with a warp each as shown in FIGS. 3 (a) and (c) is preferred since such method assures no sliding of the hollow fibers while keeping constant the clearance between the neighboring hollow fibers. FIG. 5 shows a laminate A of the hollow fiber sheets. The top and bottom surfaces of the laminate are held between a pair of shape maintaining plates 2 and 2' each having a large opening at its central part. The openings of the hollow fibers at the both ends of the laminate are sealed with resin 14 and the hollow fibers are united integrally with the shape maintaining plates 2 and 2'. The laminate is, while being held between a pair of the shape maintaining plates 2 and 2', housed in the housing. In the case where the ratio of the length to the width of the laminate is small, the shape maintaining plates may be demounted from the laminate when it is housed in the housing. In this case the shape of the laminate of the hollow fiber sheets is well maintained since its both ends are fixed with the resin.

There are no specific restrictions as to the hollow fiber 3 to be formed into a sheet by the use of warps 4, insofar as the fiber has a high gas permeability; and there can be employed hollow fibers of a microporous membrane comprising a polyolefin such as polyethylene or polypropylene, polytetrafluoroethylene, polysulfones, or the like; or of a homogeneous membrane comprising silicone rubber, or the like.

Preferred are hollow fibers comprising polyolefins, since such fibers will not, even when their membrane thickness is small, undergo buckling or deform when formed into a cord fabric. Particularly preferred is a hollow fiber comprising poly-4-methylpentene-1 because of its high gas permeability and low complement activation, as well as high affinity to blood.

The hollow fiber to be formed into a cord-fabric shape according to the present invention has an outer diameter, D, of 50 to 2,000μ and a membrane thickness of 3 to 500 μ. With the outer diameter or the membrane thickness smaller than the above specified range the fiber tends to snap or crack in the course of formation into a cord-fabric shape, while too large an outer diameter or membrane thickness will not give a compact artificial lung suited for practical use. In general, preferred is a hollow fiber having an outer diameter, D, of 100 to 500μ and a membrane thickness of 6 to 100μ.

The effective length of the hollow fiber is generally 3 to 30 cm. If the effective length is smaller than the lower limit, the breakage loss of the fiber at the fabrication of artificial lungs will be too large. On the other hand if the effective length is too large, a compact artificial lung will be difficult to realize.

A hollow fiber or a bundle of a plurality of hollow fibers constitutes a unit weft, a multiplicity of which are then formed into a cord fabric. Where a bundle of a plurality of hollow fibers constitutes a weft, preferably used is a bundle comprising not more than 35 pieces, more preferably not more than 24 pieces of hollow fibers. In a bundle comprising more than 35 pieces of hollow fibers, individual hollow fibers in the bundle may not fully contact with blood, whereby the gas exchange efficiency will decrease, which is not preferred. Generally, a single hollow fiber serves as a weft for forming a sheet of cord-fabric type. In this case, not only almost 100% of the surface area of each hollow fiber is used for gas exchange, but an unexpectedly high gas exchange performance is achieved with a relatively small membrane area and the pressure loss is small. The reason is estimated to be that distribution and mixing of blood in minute units can be done extremely efficiently thanks to the formation of uniform rectangular slits defined by the warp and the weft.

There are no particular restrictions as to the type of the warp for forming the hollow fiber into a cord fabric and there may be used any fine yarn having a high tensile strength made for example of polyesters, polyamides, polyimides, polyacrylontrile, polypropylene, polyarylates, polyvinyl alcohol, etc. Preferably used among the above are multifilament yarns of polyesters or polyamides having a yarn fineness of 10 to 150 deniers, more preferably 25 to 75 deniers, since they have good processability and will damage the hollow fiber only little due to their appropriate flexibility and mechanical strength.

Application of any finishing agent to the warp should be avoided if possible since the product is to be used for artificial lungs. Where it is unavoidable, the finishing agent must be one having already got the safety clearance or removable by washing.

The housing having contained the laminate is, since the both open ends of the hollow fibers have previously been sealed with a high-viscosity resin, immediately mounted on a centrifugal bonder. Then, a polyurethane, silicone, epoxy or the like resin is injected into the both end parts of the housing and cured there to a prescribed extent, and the both extreme ends of the resin are cut to thereby open the both ends of the hollow fiber.

In the present invention, a high gas exchanging ability is achieved by specifying the shape of a hollow fiber sheet and the conditions for laminating the hollow fiber sheets. One of the conditions, the density, W (pieces/cm), of the warps of the hollow fiber sheet of cord-fabric type must be $$0.2 \leq W \leq 4.0$$

for the purpose of yielding with a high reproducibility an artificial lung having a high material exchanging ability, causing no stagnation or channeling of blood, and at the same time having low pressure loss and low priming volume.

Where the warp density, W, is less than 0.2, the length of hollow fibers held between a pair of the warps is large to thereby often cause slackening of the hollow fibers. Consequently, it will be difficult to control to arrange the hollow fibers parallel with each other at substantially constant intervals. When the hollow fibers are thus be distributed unevenly, a larger volume of fluid flows through spaces where smaller number of hollow fibers are present caused by the slackening, thereby rendering a high gas exchanging ability impossible to achieve.

Where the warp density, W, is larger than 4.0, the hollow fibers are controlled to be parallel with each other and at a very uniform distance and the volume of flow through clearances will therefore be even. However, as the warp density increases, the area of contact between the warps and the hollow fibers increases, and the area of contact between the hollow fibers and blood, i.e. effective membrane area, decreases, and further since the blood cannot flow smoothly at the parts where the warps contact the hollow fibers (crossings) there occur a decrease in the material exchanging ability and an increase in the pressure loss.

As regards the density, F (pieces/cm), of the hollow fibers, which are wefts, along a longitudinal unit length and the number of the hollow fiber sheets laminated per unit thickness, I (sheets/cm), with increasing F and/or I the gas exchanging ability of the artificial lung clearly increases but the pressure loss of the blood side increases at the same time. For the purpose of realizing an artificial lung having a high gas exchange ability with low pressure loss, the following relationship therefore must be assured:

$$10^8/(3.0 \times D)^2 \leq F \times I < 10^8/(0.93 \times D)^2$$

wherein where the weft of a cord-fabric sheet is a single hollow fiber, D represents the outer diameter in $\mu$ of the hollow fiber; and where the weft is a bundle of a plurality of hollow fibers, D represents the outer diameter in $\mu$ of a hypothetical cylinder closest-packed with the plurality of the hollow fibers but without causing their collapse.

If $(F \times I)$ is smaller than the above range, the material exchanging ability will be small; and if $(F \times I)$ exceeds the above range, a large pressure loss will be encountered.

Another requirement of the present invention is that the thickness, T, in cm of the laminate of the hollow fiber sheets be:

$$0.5 \leq T \leq 12.0.$$

Whereas the thickness of a laminate of hollow fiber sheets particularly influences the pressure loss, a thickness exceeding the above range will cause too much pressure loss rendering a pulsation-type pump difficult to use, and on the other hand too small a thickness will render the laminate too thin, whereby the handling of the apparatus becomes complex at the time of deaeration at priming, allocation with or connectability to an artificial heart-lung apparatus, or the like.

The hollow fiber sheets formed into a cord-fabric shape as described above are then laminated one upon another in a prescribed number of sheets and the laminate is then housed in a housing. On this occasion, the laminate is placed in the housing as it is if the laminate can maintain its shape in the housing, and if not, since then the hollow fibers vibrate forced by the blood pressure whereby channeling occurs resulting in a decrease in the gas exchanging ability, the laminate must be provided on either one of the top and bottom surfaces thereof with a shape maintaining plate for holding the shape of the laminate. Whether the laminate of the hollow fiber sheets can maintain its shape in the housing or not can readily judged in the following manner:

There is a close relationship among the laminate thickness, T (cm), the number of sheets laminated per unit thickness, I (cm), the pressure loss when the flow rate of a first fluid is 50 ml/min/cm², $\Delta P_{50}$ (mmHg), and the number of hollow fibers, n (pieces), constituting single hollow fiber or a bundle of a plurality of hollow fibers forming the hollow fiber sheet. As T and/or I increases, though the gas exchanging ability of the artificial lung distinctly increases, the pressure loss of the blood side at the same time increases and vibration of hollow fibers occurs to cause a decrease in the gas exchanging ability. Therefore, for the purpose of realizing an artificial lung having a high gas exchanging ability while maintaining the shape of the laminate, there must be:

$$\Delta P_{50}/T \cdot I \cdot n \leq 1.0.$$

If $\Delta P_{50}/T \cdot I \cdot n$ is larger than the above range, the hollow fibers will suffer a too large resistance, whereby the hollow fibers are extended to cause channeling or vibration forced by blood flow. Therefore in the case where $\Delta P_{50}/T \cdot I \cdot n$ exceeds 1.0, it is necessary that a shape maintaining plate be provided to suppress the extention of the hollow fibers.

In the case of square-pillar type laminate as shown in FIG. 5, formation of clearances between the laminate of hollow fiber sheets housed in a housing and the side walls of the housing might cause blood to bypass through the clearances to thereby decrease the gas exchanging ability. For the purpose of preventing such trouble, as shown in FIG. 1, the above clearances are sealed with a sealing means 5, such as polyurethane, silicone, epoxy or the like resin, or by patching a thermoplastic film or the like on the both sides of the laminate, followed by fixing the film on the side walls of the housing. Where the clearances formed between the laminate and side walls of the housing have been sealed with a sealing means and the ratio, L/D, of the effective length, L, to the width, D, of the laminate is for example not more than 2.0, the laminate of the hollow fiber sheets can maintain its shape without the provision of any shape maintaining plate 2 or 2'.

Figure 6:
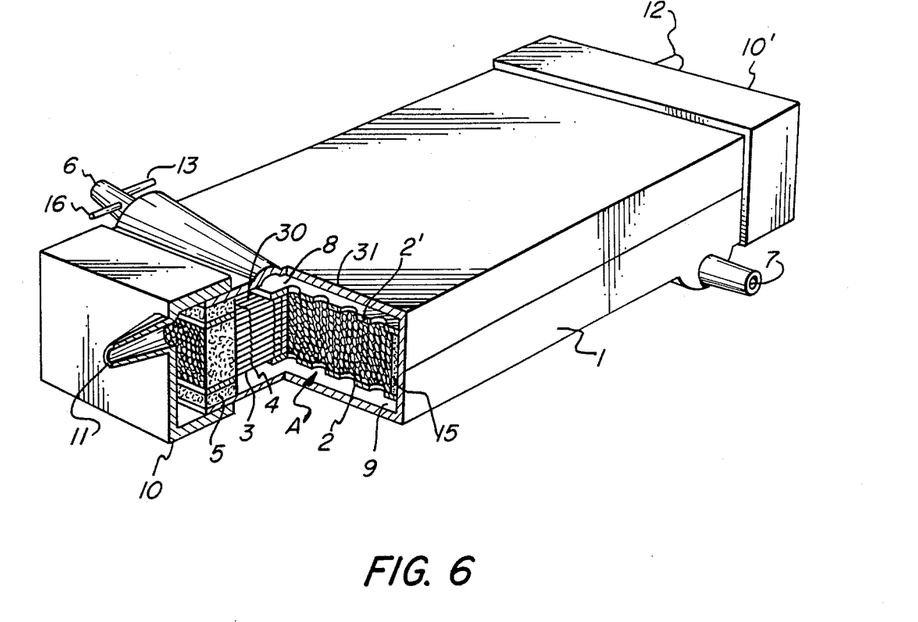
FIG. 6 is a perspective view of another example of the laminate of the hollow fiber sheets.
Figures 7, 8:
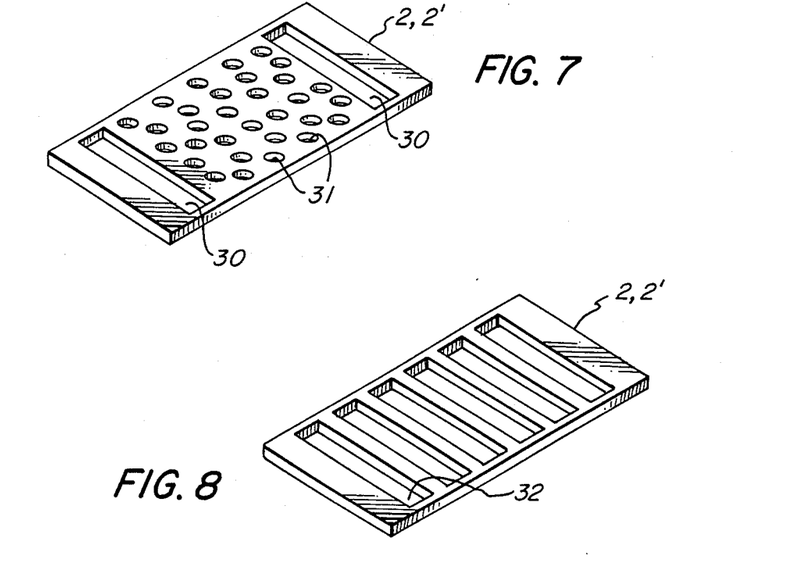
FIGS. 7 and 8 are perspective views of shape maintaining plates for holding the laminate of the hollow fiber sheets.

FIG. 6 shows an example of an artificial lung comprising a laminate A of hollow fiber sheets provided on the top and bottom surfaces thereof with a pair of shape maintaining plates 2 and 2' each having a plurality of openings. Perforated plates may be used as the shape maintaining plates 2 and 2' but, it is preferred for the purpose of preventing blood from stagnation to use, as shown in FIG. 7, a pair of plates 2 and 2' having a pair of large openings 30 at the parts contacting the resin partitions 5 on which the both ends of the laminate of hollow fiber sheets are fixed by adhesion, and a multiplicity of small openings 31 between the two large openings 30. Also may be used as having a function of preventing blood from stagnation is a plate having a plurality of large openings 32 as shown in FIG. 8. The ratio of the area of openings to the total area contacting blood, i.e. the opening ratio of the shape maintaining plate 2 or 2' is preferably at least 10%, more preferably at least 30%. In the case where the opening ratio is less than 10%, stagnation of blood occurs between neighboring openings causing thrombi and it is difficult to achieve a high gas exchanging ability per unit membrane area.

Figure 9:
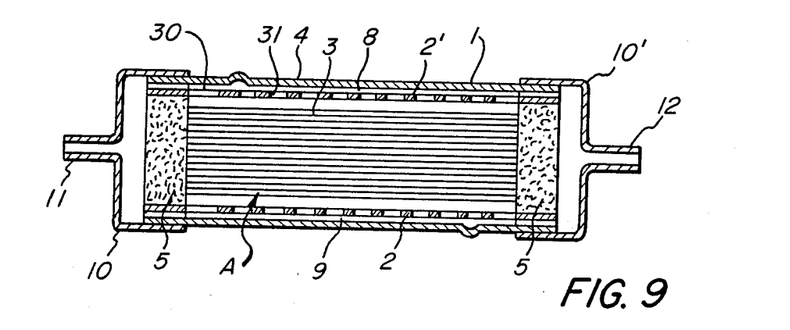
FIG. 9 is a cross-sectional view of the apparatus comprising the laminate shown in FIG. 5 housed therein.

FIG. 9 is a cross-sectional view of the artificial lung shown in FIG. 6. Here the blood flows smoothly, without causing stagnation, through an opening 30 provided on the shape maintaining plates 2 and 2', as shown by the arrow.

The shape maintaining plate 2 or 2' is a plate having a rigidity that will not allow the plate to deform by force of blood flow, made of a polyolefin such as polyethylene or polypropylene, polystyrene, polyacrylates, polyamides, polycarbonates, thin metal plates or the like. Generally used preferably are resin plates having a thickness of 0.5 to 5 mm, made of a polycarbonate, polyamide, or a polyolefin.

The apparatus of the present invention may be used as an artificial lung as consolidated with a heat exchanger such as piping of stainless steel, aluminum or the like metals mounted in the blood inlet chamber 9 or blood outlet chamber 8 formed in the housing.

Figure 10:
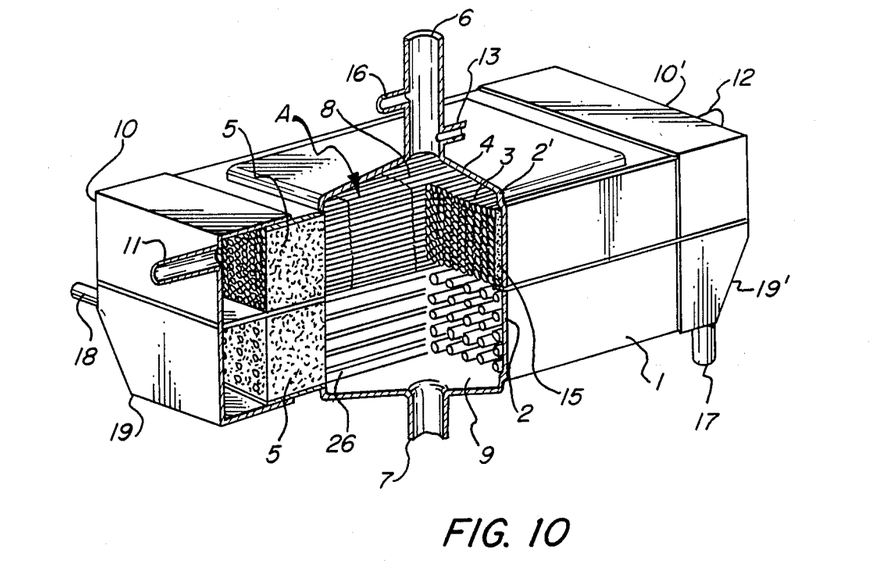
FIG. 10 is a perspective view of an apparatus comprising a heat exchanger housed in the space formed by the laminate of hollow fiber sheets and the housing.

FIG. 10 is an example of the artificial lung comprising a heat exchanger mounted in the blood chamber, in which a multiplicity of pipes 26 for heat exchanging are mounted in the blood inlet chamber 9 parallel with hollow fibers 3, both ends of the pipes being provided with head covers 19 and 19' having an inlet 17 and an outlet 18 for heating medium.

Figure 11:
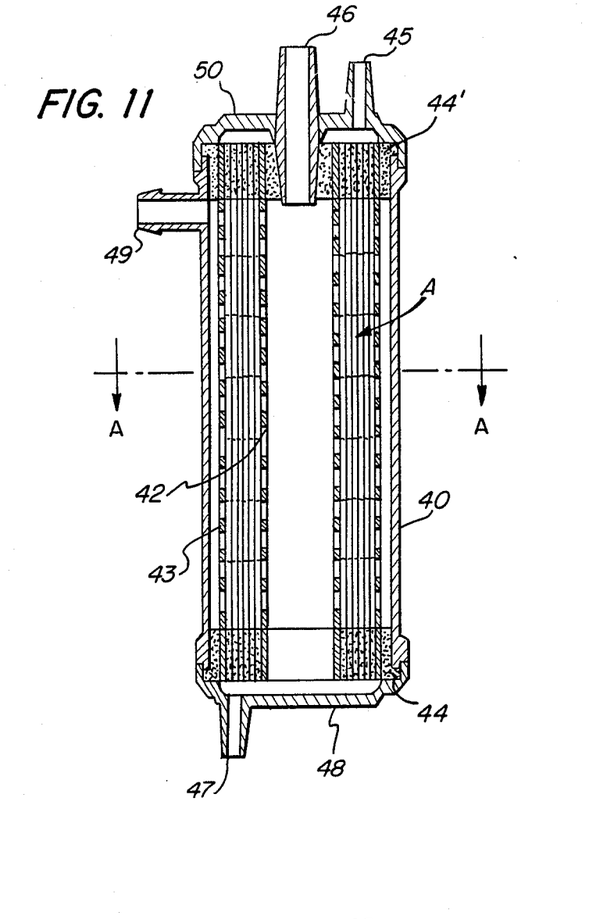
FIG. 11 is a cross-sectional view of an apparatus utilizing the laminate of hollow fiber sheets formed cylindrically.
Figure 12:
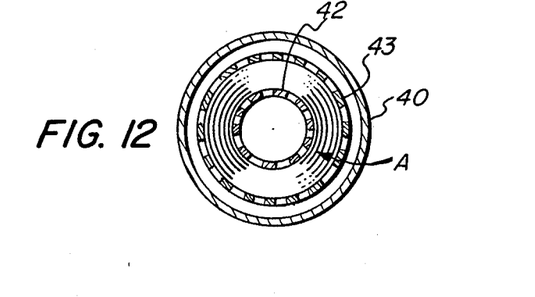
FIG. 12 is a cross-sectional view of the apparatus of FIG. 10 taken on line A—A.

FIG. 11 shows an example of the artificial lung comprising a laminate A of hollow fiber sheets housed in a cylindrical housing 40. The laminate A of the hollow fiber sheets is obtained by, as shown in FIG. 12, wrapping an endless hollow fiber sheet of cord-fabric type around an apertured inner cylinder 42, then covering the wrap with a pair of half-split outer cylinders, and bonding the joints of the two outer half-cylinders by ultrasonic bonding to thereby complete a consolidated outer cylinder 43, whereby the laminate can maintain its shape.

In FIG. 11, the laminate A of the hollow fiber sheets housed between the apertured inner cylinder 42 and the outer cylinder 43 is supported and fixed with partitions 44 and 44' sealing the both ends of the housing such that the both ends are kept open outwardly.

The top end of the cylindrical housing 40 is covered with a top head cover 50 having a gas inlet 45 and a blood inlet 46 connecting with the inside of the apertured inner cylinder 42. The bottom end of the housing is covered with a bottom head cover 48 having a gas outlet 47 connecting with internal spaces of the hollow fibers.

The cylindrical housing 40 is provided on its upper side wall with a blood outlet 49. The tip of the blood inlet 46 penetrates the upper partition 44' and opens into the inside of the apertured inner cylinder 42.

The blood introduced from the inlet 46 into the inside of the apertured inner cylinder 42 flows through the holes on the apertured inner cylinder into the gas exchange chamber, and then flows radially in the gas exchange chamber outwardly to finally discharge through blood outlet 49 provided on the upper wall of the cylindrical housing 40. The gas introduced from gas inlet 45 into the inside of hollow fibers flow downwardly to the lower part of the cylindrical housing.

The fluid treating apparatus of hollow fiber type of the present invention can be used for, in addition to the above-described artificial lung, treating many other fluids. For example, it can be used for a dialysis which comprises conducting mass transfer between two kinds of liquids via hollow fiber. In this case the two liquids may either be flown inside or outside the hollow fiber but, it is generally preferred that the liquid containing a substance(s) to be dialyzed be flown inside the hollow fiber. The apparatus of the present invention can also be used for a gas exchange which comprisies conducting mass transfer between between a gas and a liquid via hollow fiber to thereby dissolve the gas in the liquid or discharge the gas. In this case it is preferred that the gas be flown inside the hollow fiber while the liquid flown outside. Further, the apparatus can be used for conducting mass transfer via hollow fiber between two kinds of gases or for filtering or condensing a gas or liquid by separating a specific substance(s) contained therein. In this case either one of the two kinds of gases or the gas and liquid may be flown inside the hollow fiber.

The present inventors have conducted various experiments to confirm the effect of the present invention, which are shown hereinbelow.

Experiment 1

A plurality of microporous polypropylene hollow fibers each having an outer diameter of $360\mu$, an inner diameter of $280\mu$ and a porosity of about 50% are arranged parallel with each other in a density in the longitudinal direction, F, of 17 pieces/cm, and woven into a cord-fabric shape using as the warp a polyester yarn of 30 deniers/12 filaments in a warp density in the transversal direction, W, of 1 piece/cm. The thus prepared hollow fiber sheet was, as shown in FIG. 2, folded into a laminate having a number of sheets per unit thickness, I, of 30 sheets/cm, a width of 8 cm and a thickness, T, of 4 cm. The ($F \times I$) of the thus obtained laminate was 510 and the effective membrane area was 1.58 m². The laminate was then held between a pair of apertured polypropylene plates of a thickness of 3.5 mm and with a multiplicity of holes each having a diameter of 3 mm and located at 8-mm intervals as well as a pair of larger openings at the both ends thereof having a width of 20 mm as shown in FIG. 7, and the obtained unit was housed in a square-pillar shape housing. The both ends of the hollow fiber sheets were bonded liquid tight with a pair of polyurethane partitions to the housing, and then a resin was filled into the clearances formed between the both sides of the laminate and the side walls of the housing, to prepare an artificial lung as shown in FIG. 6.

The thus obtained artificial lung was tested according to "DRAFT OF EVALUATION STANDARD FOR ARTIFICIAL LUNG PERFORMANCE" (Japan Artificial Organs Association) by flowing a bovine blood warmed to a temperature of 37° C. and pure oxygen gas while the ratio of oxygen flow rate to the blood flow rate was maintained at 1.0. The maximum blood flow rate, the pressure loss and the $P_{50}/T \cdot I \cdot n$ were 7,300 ml/min/m², 105 mmHg and 0.365 respectively, proving the extremely high gas exchanging ability of the artificial lung tested as compared to those of conventional ones.

Experiments 2 through 5

Four kinds of artificial lungs comprising hollow fiber laminates having thicknesses, T's, shown in Table 2 were prepared using the same hollow fiber sheet as in Experiment 1. They were tested in the same manner as in Experiment 1 and the results are shown in Table 1.

In the evaluation results shown below, a maximum blood flow rate of not more than 2,000 ml/min/m² or a pressure loss at a blood flow rate of 6 l/min of not less than 300 mmHg has some problem in practice, and hence marked at the right end of the column.

TABLE 1

| Exp. No. | Effective membrane area (m²) | Thickness of laminate of hollow fiber sheets, T (cm) | Maximum flow rate of blood (ml/min/m²) | Pressure loss (mm Hg) | $\Delta P_{50}/T \cdot I \cdot n$ |
|---|---|---|---|---|---|
| 2 | 0.12 | 0.3 | 1300 | 5 | 16.7 |
| 3 | 0.39 | 0.7 | 2100 | 5 | 0.816 |
| 4 | 3.95 | 10.0 | 5600 | 240 | 0.174 |
| 5 | 6.31 | 16.0 | 3800 | 650 | 1.71 |

Experiments 6 through 9

For kinds of hollow fiber sheets having different warp densities, W's. In the same manner as in Experiment 1, they were each formed into a laminate having a thickness, T, of 4 cm and a membrane are of 1.58 m² to prepare four artificial lungs, and the artificial lungs were tested in the same manner as in Experiment 1. The results are shown in Table 2.

TABLE 2

| Experiment No. | Density of warps, W (pieces/cm) | Maximum flow rate blood (ml/min/m²) | Pressure loss (mm Hg) | $\Delta P_{50}/T \cdot I \cdot n$ |
|---|---|---|---|---|
| 6 | 0.1 | 1900 | 80 | 1.07 |
| 7 | 0.2 | 2200 | 75 | 0.857 |
| 8 | 4 | 7300 | 180 | 0.626 |
| 9 | 6 | 6000 | 250 | 1.05 |

Experiments 10 through 14

The same hollow fiber as in Experiment 1 was used, and multiplicities of them were arranged in various densities, F's, in the longitudinal direction and then woven into cord-fabric shape hollow fiber sheets in the same manner as in Experiment 1 in a warp density, W, of 1 piece/cm. The sheets were formed into laminates all with the same thickness, T, of 4 cm by laminating a different number of the sheets, I's. Five artifical lungs were then prepared using the thus obtained laminates and evaluated, in the same manner as in Experiment 1. The results are shown in Table 3.

TABLE 3

| Exp. No. | Effective membrane area (m²) | Density of hollow fibers, F (pieces/cm) | Number of sheets laminated per unit thickness, I (sheets/cm) | F × I | Maximum flow rate (ml/min/m²) | Pressure loss (mmHg) | $\Delta P_{50}/T \cdot I \cdot n$ |
|---|---|---|---|---|---|---|---|
| 10 | 0.23 | 5 | 15 | 75 | 900 | 8 | 3.05 |
| 11 | 0.46 | 5 | 30 | 150 | 2000 | 14 | 0.609 |
| 12 | 2.32 | 15 | 50 | 750 | 3900 | 220 | 0.587 |
| 13 | 2.32 | 30 | 45 | 750 | 5900 | 290 | 0.573 |
| 14 | 3.87 | 25 | 50 | 1250 | 4200 | 690 | 1.04 |

Experiments 15 through 18

Pluralities of the hollow fibers shown in Test 1 were bundled. Groups of the bundles were each arranged in different longitudinal densities and woven into a hollow fiber sheet in the same manner as in Experiment 1. Four laminates were prepared from the sheets with different number of sheets laminated, I's, to be of the same thickness of 4 cm. Four artificial lungs similar to those in Experiment 1 were obtained using the laminates and evaluated in the same manner as in Experiment 1. The results are shown in Table 4.

TABLE 4

| Exp. No. | Number of hollow fibers constituting a bundle of hollow fibers (pieces) | Effective membrane area (m²) | Density of hollow fibers, F (pieces/cm) | Number of sheets laminated per unit thickness, T (sheets/cm) | F × I | Maximum flow rate of blood (ml/min/m²) | Pressure loss (mmHg) | $\Delta P_{50}/T \cdot I \cdot n$ |
|---|---|---|---|---|---|---|---|---|
| 15 | 7 | 0.97 | 3 | 15 | 45 | 4100 | 54 | 0.154 |
| 16 | 7 | 0.32 | 1 | 15 | 15 | 2600 | 16 | 0.215 |
| 17 | 19 | 1.18 | 2 | 10 | 20 | 2200 | 43 | 0.104 |
| 18 | 37 | 1.15 | 2 | 5 | 10 | 700 | 128 | 1.04 |

Experiments 19 through 22

A hollow fiber of a microporous polypropylene hollow fiber having an outer and inner diameters of 250μ and 210μ respectively and a porosity of about 50% was used to prepare a hollow fiber sheet in which single filaments of the hollow fiber were arranged as wefts and woven with warps. Four kinds of laminates were obtained using the above-prepared sheet with parameters shown in Table 5, and corresponding artificial lungs were prepared from the laminates and evaluated in the same manner as in Experiment 1. The results are shown in Table 5.

TABLE 5

| Exp. No. | Effective membrane area (m²) | Thickness of laminate of hollow fiber sheets, T (cm) | Density of warps, W (pieces/cm) | Density of hollow fibers, F (pieces/cm) | Number of sheets laminated per unit thickness, I (sheets/cm) | F × I | Maximum flow rate of blood (ml/min/m²) | Pressure loss (mmHg) | $\Delta P_{50}/T \cdot I \cdot n$ |
|---|---|---|---|---|---|---|---|---|---|
| 19 | 0.11 | 0.3 | 1 | 22 | 30 | 660 | 1400 | 21 | 74.7 |
| 20 | 1.53 | 4.0 | 1 | 22 | 30 | 660 | 6900 | 66 | 0.251 |
| 21 | 0.52 | 4.0 | 1 | 15 | 15 | 225 | 3200 | 20 | 0.958 |
| 22 | 1.53 | 4.0 | 0.1 | 22 | 30 | 660 | 1700 | 240 | 3.69 |

Experiment 23

A hollow fiber sheet was formed by arranging parallel a multiplicity of microporous polyvinyl alcohol hollow fiber having an outer and inner diameters of 510μ and 320μ respectively and a porosity of about 50% in a density in the longitudinal direction, F, of 14 pieces/cm as wefts and woven with warps of polyester yarn of 30 deniers/12 filaments in a warp density, W, of 1 piece/cm into a cord fabric. The thus obtained endless sheet was folded reciprocally to form a laminate of the hollow fiber sheets having a number of sheets laminated, I, of 22 sheets/cm, a width of 6 cm and a thickness, T, of 4 cm. The laminate was then held between a pair of the plates shown in FIG. 7 and the obtained unit was housed in a housing to give an apparatus as shown in FIG. 6. The then effective length was 7 cm. The (F × I) and the effective membrane area of the obtained laminate were 308 and 0.52 m² respectively.

Into the thus prepared apparatus, bovine blood warmed up to 37° C. was flown outside, extracapillarily, the hollow fibers at a blood flow rate of 100 ml/min.

The flow rate of the inside filtrate was stepwise increased. Then, the maximum flow rate filtered, $Q_{fmax}$, just before a sharp rise of the pressure difference via the membrane in 30 minutes was 42.5 ml/min and the $\Delta P_{50}/T \cdot I \cdot n$ was 0.716, proving a higher flow rate achieved as compared to that conventional apparatuses.

Experiment 24

A hollow fiber sheet was formed by arranging parallel a multiplicity of ethylene-vinyl alcohol copolymer hollow fiber having an outer and inner diameters of 225μ and 175μ respectively in a density in the longitudinal direction, F, of 24 pieces/cm as wefts and woven with warps of polyester yarn of 30 deniers/12 filaments in a warp density, W, of 1 piece/cm into a cord fabric. The thus prepared endless sheet was folded reciprocally to form a laminate of the hollow fiber sheets having a number of sheets laminated, I, of 45 sheets/cm, a width of 6 cm and a thickness, T, of 4 cm. The laminate was then, in the same manner as in Experiment 23, held between a pair of plates and the obtained unit was housed in a housing to give an apparatus as shown in FIG. 6. The F×I and the effective membrane area of the laminate were 1080 and 1.14 m², respectively and the effective length of the hollow fiber was 8 cm. The apparatus was tested while bovine blood warmed to 37° C. was flown inside the hollow fibers and the dialysate outside according to ARTIFICIAL KIDNEY EVLUATION STANDARD made by Japan Artificial Organs Association to give a clearance of urea and $\Delta P_{50}/T \cdot I \cdot n$ of 157 ml/min and 0.533 respectively.

Experiment 25

A hollow fiber sheet was formed by arranging parallel a multiplicity of microporous poly-4-methylpentene-1 hollow fiber having an outer and inner diameters of 260μ and 210μ respectively in a density in the longitudinal direction, F, of 22 pieces/cm as wefts and woven with warps of polyester yarn of 30 deniers/12 filaments in a warp density, W, of 1 piece/cm into a cord fabric. The thus prepared endless sheet was folded reciprocally to form a laminate of the hollow fiber sheets having a number of sheets laminated, I, of 36 sheets/cm, a width of 4 cm and a thickness, T, of 3 cm. The F×I of the laminate was 792 and the effective length and the effective membrane area of the hollow fiber were 4 cm and 0.22 m² respectively. The laminate was then housed in a housing, then the both sides of the laminate were bonded with a polyurethane resin liquid tight to the housing, and the clearances 9 then formed between the both sides of the laminate of the hollow fiber sheets and the side walls of the housing were filled with a resin to give an apparatus as shown in FIG. 1. The apparatus was tested in the same way as in Experiment 1. Then, the maximum blood flow rate was 5,500 ml/min/m², and the pressure loss and the $\Delta P_{50}/T \cdot I \cdot n$ were 45 mmHg and 0.278 respectively.

Experiments 26 through 29

The same hollow fiber sheet as in Experiment 25 was used to prepare four artificial lungs having different laminate thicknesses, T's which were then tested in the same manner as in Experiment 1. The results are shown in Table 6. The then effective length of the hollow fiber and the width of the laminates were 10 cm and 5 cm, respectively.

TABLE 6

| Exp. No. | Effective membrane area (m²) | Thickness of laminate of hollow fiber sheets, T (cm) | Maximum flow rate of blood (ml/min/m²) | Pressure loss (mm Hg) | $\Delta P_{50}/T \cdot I \cdot n$ |
|---|---|---|---|---|---|
| 26 | 0.07 | 0.3 | 1200 | 1 | 2.76 |
| 27 | 0.16 | 0.7 | 3000 | 4 | 0.827 |
| 28 | 2.35 | 10.0 | 4700 | 290 | 0.183 |
| 29 | 2.82 | 12.5 | 4200 | 570 | 1.10 |

Experiment 30

A hollow fiber sheet was formed by arranging parallel a multiplicity of microporous polypropylene hollow fiber having an outer and inner diameters of 360μ and 280μ respectively and a porosity of about 50% in a density in the longitudinal direction, F, of 17 pieces/cm as wefts and woven with warps of polyester yarn of 30 deniers/12 filaments in a warp density, W, of 1 piece/cm into a cord fabric. A laminate of the hollow fiber sheets was obtained by wrapping the hollow fiber sheet of cord-fabric type around an apertured polypropylene inner cylinder with a diameter and a thickness of 2 cm and 2.5 mm respectively having a multiplicity of holes each having a diameter of 3 mm and spaced at 8-mm intervals, to a thickness of the laminate, T, of 3 cm, a laminate of the hollow fiber sheets having a number of sheet laminated, I of 30 sheets/cm, then covering the wrap with a pair of half-split outer apertured polypropylene cylinders with a diameter and a thickness of 8.5 cm and 2.5 mm respectively having a multiplicity of holes each having a diameter of 3 mm and spaced at 8-mm intervals, and bonding the joints of the two outer half-cylinders by ultrasonic bonding to thereby complete a consolidated outer cylinder, which maintained the laminate of the hollow fiber sheets. The F×I and the effective membrane area of the laminate were 510 and 1.48 m² respectively. The laminate unit was housed in a cylindrical housing having a diameter and a thickness of 10 cm and 2.5 mm respectively. The both ends of the hollow fibers were held with a pair of polyurethane partitions formed at the both ends of the housing to complete an apparatus as shown in FIG. 11. The apparatus was tested in the same way as in Experiment 1 to give a maximum blood flow rate, a pressure loss and a $\Delta P_{50}/T \cdot I \cdot n$ of 6,500 ml/min/m², 85 mmHg and 0.232 respectively.

Obviously, numerous modifications and variations of the present invention are possible in light of the above teachings. It is therefore to be understood that within the scope of the appended claims, the invention may be practiced otherwise than as specifically described herein.

What is claimed is:

1. A fluid treating apparatus of hollow fiber type which comprises:
   a laminate of hollow fiber sheets comprising a multiplicity of single hollow fibers or bundles of hollow fibers connected through warps,
   a housing having an inlet and outlet for a first fluid which inlet and outlet connect with the space formed by the hollow fibers and the housing and an inlet and outlet for a second fluid which inlet and outlet connect with inside of the hollow fibers, and
   a pair of resin partitions in which the both ends of the laminated hollow fiber sheets are embedded;

said laminate of hollow fiber sheets having properties for preventing stagnation and channeling of said fluid and satisfying the following formulae:

$$0.2 \leq W \leq 4.0$$

$$0.5 \leq T \leq 12.0$$

$$10^8/(3.0 \times D)^2 \leq F \times I < 10^8/(0.93 \times D)^2$$

wherein:
D is the diameter in μ of a hollow fiber or a bundle of hollow fibers,
W is the density in pieces per cm of the warps connecting a multiplicity of single hollow fibers or bundles of hollow fibers,
F is the density in pieces per cm of single hollow fibers or bundles of a plurality of hollow fibers per unit length of the hollow fiber sheet,
I is the number of hollow fiber sheets laminated per unit thickness in sheets per cm, and
T is the thickness in cm of the laminate of the hollow fiber sheets.

2. The fluid treating apparatus of claim 1 satisfying the following formula:

$$\Delta P_{50}/T \cdot I \cdot n \leq 1.0$$

wherein $\Delta P_{50}$ is the pressure loss in mmHg when the flow rate of a first fluid is 50 ml/min/cm² and n is the number of hollow fibers constituting a single hollow fiber or a bundle of a plurality of hollow fibers, connected through warps.

3. The fluid treating apparatus of claim 1, wherein said laminate of hollow fiber sheets is held between a pair of shape maintaining plates each having at least one opening.

4. The fluid treating apparatus of claim 1, wherein said hollow fiber sheets have been laminated to form a square-pillar shape laminate and the clearances formed by the both sides of the laminate and the side walls of the housing are clogged with a sealing means.

5. The fluid treating apparatus of claim 1, wherein said hollow fiber sheets have been laminated to form a cylindrical laminate, said laminate being held between two shape maintaining cylinders each having a plurality of openings.

6. The fluid treating apparatus of claim 1, comprising a heat exchanging means housed in the space formed by the housing and the hollow fibers inside the housing.

7. The fluid treating apparatus of claim 1, having a gas exchanging ability, the first fluid and the second fluid being blood and a gas respectively.

8. A method of using a fluid treating apparatus of hollow fiber type comprising the steps of:
providing an apparatus including a laminate of hollow fiber sheets comprising a multiplicity of single hollow fibers or bundles of hollow fibers connected through warps,
a housing having an inlet and outlet for a first fluid which inlet and outlet connect with the space formed by the hollow fibers and the housing and an inlet and outlet for a second fluid which inlet and outlet connect with inside of the hollow fibers, and
a pair of resin partitions in which the both ends of the laminated hollow fiber sheets are embedded;
said laminate of hollow fiber sheets having properties for preventing stagnation and channeling of said fluid and satisfying the following formula:

$$0.2 \leq W \leq 4.0$$

$$0.5 \leq T \leq 12.0$$

$$10^8/(3.0 \times D)^2 \leq F \times I < 10^8/(0.93 \times D)^2$$

wherein:
D is the diameter in μ of a hollow fiber or a bundle of hollow fibers,
W is the density in pieces per cm of the warps connecting a multiplicity of single hollow fibers or bundles of hollow fibers,
F is the density in pieces per cm of single hollow fibers or bundles of a plurality of hollow fibers per unit length of the hollow fiber sheet,
I is the number of hollow fiber sheets laminated per unit thickness in sheets per cm, and
T is the thickness in cm of the laminate of the hollow fiber sheets, and
treating said fluid with said apparatus.

9. The method of claim 8, wherein said fluid treating apparatus satisfies the following formula:

$$\Delta P_{50}/T \cdot I \cdot n \leq 1.0$$

wherein $\Delta P_{50}$ is the pressure loss in mmHg when the flow rate of a first fluid is 50 ml/min/cm² and n is the number of hollow fibers constituting a single hollow fiber or a bundle of a plurality of hollow fibers, connected through warps.

10. The method of claim 8, wherein said laminate of hollow fiber sheets is held between a pair of shape maintaining plates each having at least one opening.

11. The method of claim 8, wherein said hollow fiber sheets have been laminated to form a square-pillar shape laminate and the clearances formed by the both sides of the laminate and the side walls of the housing are clogged with a sealing means.

12. The method of claim 8, wherein said hollow fiber sheets have been laminated to form a cylindrical laminate, said laminate being held between two shape maintaining cylinders each having a plurality of openings.

13. The method of claim 8, wherein said fluid treating apparatus comprises a heat exchanging means housed in the space formed by the housing and the hollow fibers inside the housing.

14. The method of claim 8, wherein said fluid treating apparatus has a gas exchanging ability and the first fluid and the second fluid are blood and a gas respectively.

* * * * *